June 23, 1964   N. L. DOOTSON   3,137,879
LATHER AND CREAM SPREADER AND LEVELER
Filed Sept. 17, 1962
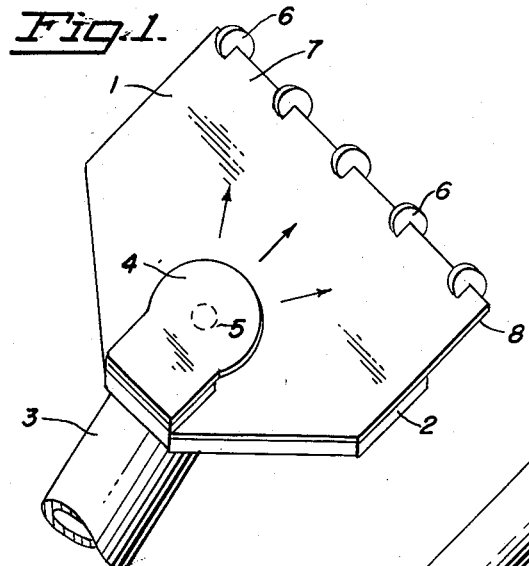
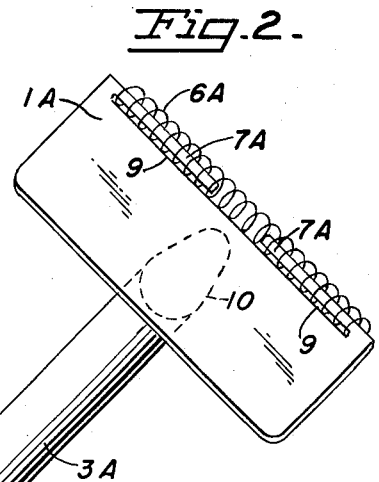
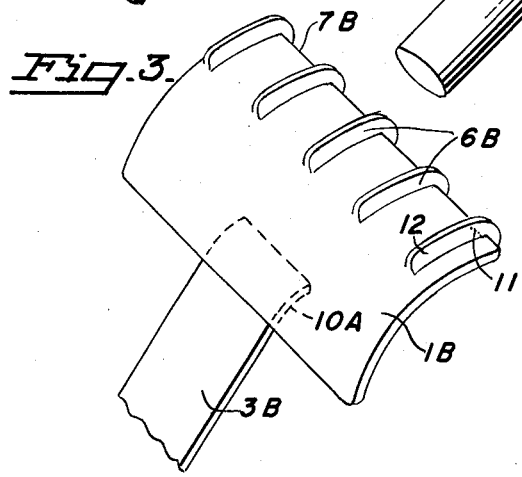
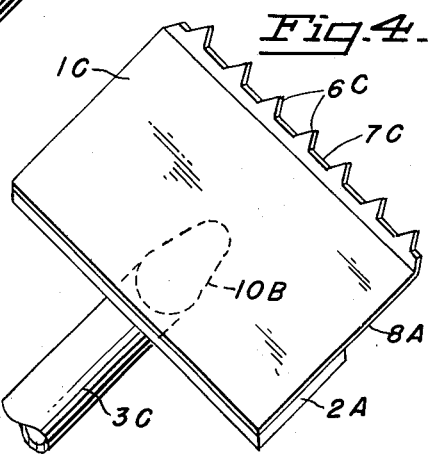
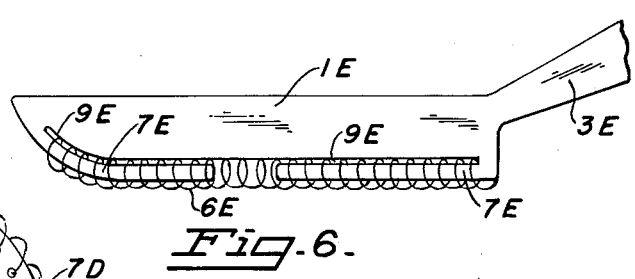
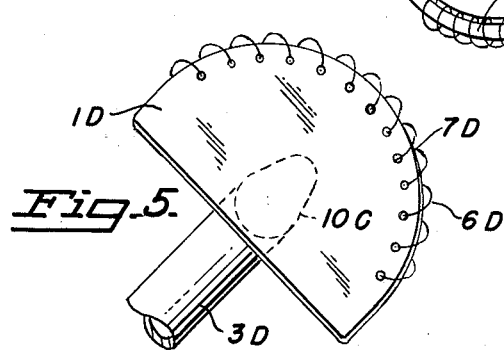
INVENTOR.
Norman L. Dootson 3,137,879
LATHER AND CREAM SPREADER AND LEVELER
Norman Leslie Dootson, Box 1622, San Francisco, Calif., assignor of one-third to Winifred M. Colombo, San Francisco, Calif.
Filed Sept. 17, 1962, Ser. No. 223,884
2 Claims. (Cl. 15—236)

The invention relates particularly to applicator spreaders for pressurized shaving lather, which is usually applied to the face by hand, resulting in uneven spreading of the lather, with thick and thin and bare areas of lather. The thick areas are wasteful and the thin areas allow the lather to dry out during the shaving process, which is not conducive to good smooth shaving.

Therefore the primary object of this improvement is to provide a lather spreader with means for overcoming this uneven and faulty method of hand-spreading the lather. This improvement employs a series of small spaced spacers extending from the spreader surface at the leaving edge thereof for the purpose of providing a substantially uniform and even layer of lather of a predetermined depth on the face, and thus avoiding too thin or thick areas or bare spots. This even layer of lather keeps all of the hairs surrounded in a sufficient depth of lather to keep them moist and soft while shaving, resulting in smoother shaves and in the blade cutting better and retaining its real sharp edge longer.

The above mentioned means may take varying forms which are explained in the following description, in connection with the accompanying drawing, in which:

FIGURE 1 is a perspective view of one form of the lather spreader-leveler, adapted to be fastened onto the discharge neck of a can of pressurized lather, and having a lather guiding plate.

FIGURE 2 is a perspective view of another form of spreader-leveler, with a rake-like handle.

FIGURES 3, 4, and 5 are perspective views of modified forms of FIGURE 2 type (with the rake-like handles broken off near the upper ends).

FIGURE 6 is a plan view of a modified form (with only a portion of a knife-like handle showing).

Referring to the drawing in detail, FIGURE 1 shows spreader face 1 with a reinforcing backing plate 2 extending over its lower area only. Hollow neck 3 is adapted to fit onto the discharge neck of a can of pressurized lather, and channels the lather through holes in plate 2 and face 1 to the underside of lather guiding plate 4 as indicated by the circle dotted line 5. This lather guiding plate 4 is forwardly spaced above face 1 and guides the lather forward and sidewise as indicated by the three arrows and is fully explained in my previous patent application on a similar device, filed June 6, 1961, Serial No. 124,755, now abandoned. This spreader applicator fits onto the can of lather at an angle convenient for spreading the lather onto the face, the can serving as a handle. A series of thin spaced disks 6 extend along the lather leaving edge 7 of face 1. It will be noted that this type of a spacer should be of approximately plastic playing card stiffness and thickness and extends upward, forward, and downward of the spreader face and edge, resulting in clearance space between the user's face and the spreader edge at any and all angles that the spreader is tilted in the spreading operation. These small thin spacer disks 6 can be formed into the edge of spreader 1 when it is molded if of plastic or they can be cemented into slots in the edge of the spreader after it is made. Spreader 1 is preferably made of thin stiff plastic of player card thickness which will allow a certain amount of flexibility over its unreinforced upper portion 8, so as to follow the contours of the face. In using this disk type spreader-leveler, only downward or straight in-line strokes should be used in spreading the lather onto the face, to avoid streaking the lather layer.

In FIGURE 2 the spaced spacer means is provided by a fine wire open coil spring 6–A, which fits into narrow slots 9 and over elongated fingers 7–A, which extend along the forward edge of spreader 1–A. Open space between the tips of fingers 7–A allow for assembling the coil spring. Handle 3–A is set at an angle as indicated by dotted lines 10. In the operation of FIGURE 2 type, the lather may be first placed on the face by hand and then the spreader-leveler be used to even out the lather with raking fashion strokes, or the lather may be applied to the spreader from the can and then to the face. It will be noted that with a fine wire open coil the lather layer can be leveled with less chance of leaving stroke marks, even if sidewise as well as straight in-line strokes are used, due to the open spaces of the coil rings, in contrast to closed disks of FIG. 1, which leave streaks if operated sidewise. It is obvious that the coil spring could be fastened to the spreader in other ways than that shown, such as cementing the spring across the surface of the spreader at the edge or back from the edge etc., and more than one row of springs could be used. It is also understood that a narrow spreader about ½ inch long and 2 or 2½ inches wide with two rows of spacers, one along its forward edge and one ½ inch away along its rear edge may be made if desired.

In FIGURE 3 the spaced spacers 6–B are in the form of elongated thin runners extending from edge 7–B toward the center of curved spreader 1–B. Dotted lines 11 show how the forward portion of this spacer could be cut-off resulting in a somewhat shorter runner 12.

In FIGURE 4 the spacers 6–C take the form of pointed teeth extending from angle bent edge 7–C. The spreader 1–C has a stiff flexible portion 8–A and a reinforced rigid portion as at 2–A.

FIGURE 5 has a spaced fine wire coil 6–D threaded over its curved forward spreading edge 7–D.

FIGURE 6 shows spreader 1–E in the form of a spreading knife with coil spring 6–E fitted along its spreading edge. This form could be used for spreading a measured layer of whipped cream etc. onto a cake, the depth of the layer depending upon the size of the spring protruding from the spreader.

From the foregoing description and the drawings, it will be noted that in the six variations shown, the main surface of the spreader plate is plain and unobstructed so that the cream is free to slide forwardly when the spreader is dragged over the face of a user, and pass through the spaces of the leveler teeth or coil spaces in a substantially even layer to the user's face. Also during this spreading process the lather is pressed and packed around the whiskers by this smooth spreading plate. And this even layer of pressed and "packed" lather prepares the whiskers for a perfect shave, resulting in the blade cutting better and retaining a sharp smooth cutting edge longer.

It will also be noted that the spaced "teeth" or spaced wire coils are located along one side of the smooth unobstructed portion of the spreader plate, and preferably at the lather leaving edge of the plate.

Also that all of the leveling teeth are relatively thin and spaced many times their thickness so as to exert substantially no retarding effect on the lather passing through between them as the spreader is dragged over the face of the user, or leave any gaps or uncovered streaks or grooves in the even layer of lather applied.

Having thus described my invention and its novel mode of operation, what I claim is:

1. An applicator for shaving lather or the like having a spreader, and means carried by the spreader determining the thickness of the layer of lather being spread said means comprising a plurality of small curved wire spaced loops secured across the surface of the spreader.

2. An applicator for shaving lather or the like having a spreader with a lather leaving edge, and means carried by the spreader determining the thickness of the layer or lather being spread said means comprising a plurality of spaced projections, each of said projections extending both vertically upward from the spreader surface and laterally outward beyond the lather leaving edge.

References Cited in the file of this patent

UNITED STATES PATENTS

| | | |
|---|---|---|
| 1,796,346 | Rudof | Mar. 17, 1931 |
| 1,860,790 | Schultheiss | May 31, 1932 |
| 2,034,137 | Fitz-Gibbon | Mar. 17, 1936 |
| 2,336,357 | Hixson | Dec. 7, 1943 |
| 2,557,221 | Gazda | June 19, 1951 |
| 2,982,987 | Knapp | May 9, 1961 |
| 3,032,803 | Walshauser | May 8, 1962 |
| 3,110,919 | Barnby | Nov. 19, 1963 |

FOREIGN PATENTS

| | | |
|---|---|---|
| 1,179,301 | France | Dec. 22, 1958 |